US011429376B2

(12) United States Patent
Doddadalivatta Venkatesh Prasad et al.

(10) Patent No.: US 11,429,376 B2
(45) Date of Patent: Aug. 30, 2022

(54) RUN-TIME MODIFICATION OF AN APPLICATION DEFINITION SCHEMA THAT CONTROLS THE BEHAVIOR OF A SOFTWARE APPLICATION

(71) Applicant: Oracle International Corporation, Redwood Shores, CA (US)

(72) Inventors: Srikanth Doddadalivatta Venkatesh Prasad, Bangalore (IN); Kaarthik Balasubrahmanian, Belmont, CA (US); Donald Creig Humes, Yorktown, CA (US); Sridhar Tadepalli, Bangalore (IN); Saravanan Anandan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/113,621

(22) Filed: Dec. 7, 2020

(65) Prior Publication Data
US 2022/0179645 A1    Jun. 9, 2022

(51) Int. Cl.
*G06F 8/656* (2018.01)
*G06F 16/9532* (2019.01)
*G06F 16/9538* (2019.01)
*G06F 8/10* (2018.01)

(52) U.S. Cl.
CPC ............... *G06F 8/656* (2018.02); *G06F 8/10* (2013.01); *G06F 16/9532* (2019.01); *G06F 16/9538* (2019.01)

(58) Field of Classification Search
CPC ......... G06F 8/656; G06F 8/10; G06F 16/9532

USPC .................................................. 717/168–175
See application file for complete search history.

(56) References Cited

U.S. PATENT DOCUMENTS

| | | | | |
|---|---|---|---|---|
| 5,913,205 A * | 6/1999 | Jain | ......................... | G06F 16/58 |
| 6,216,137 B1 * | 4/2001 | Nguyen | ................ | G06F 16/258 |
| 6,324,693 B1 * | 11/2001 | Brodersen | ................. | G06F 8/65 |
| | | | | 707/999.203 |
| 6,367,077 B1 * | 4/2002 | Brodersen | ............... | G06F 16/23 |
| | | | | 717/169 |
| 6,389,589 B1 * | 5/2002 | Mishra | ...................... | G06F 8/61 |
| | | | | 707/999.009 |
| 6,631,519 B1 * | 10/2003 | Nicholson | ............. | G06F 16/211 |
| | | | | 707/999.102 |
| 7,577,934 B2 * | 8/2009 | Anonsen | ................... | G06F 8/20 |
| | | | | 717/102 |

(Continued)

OTHER PUBLICATIONS

Larson et al, "A Theory of Attribute Equivalence in Databases with Application to Schema Integration", IEEE, pp. 449-463 (Year: 1989).*

(Continued)

*Primary Examiner* — Anil Khatri
(74) *Attorney, Agent, or Firm* — Invoke

(57) ABSTRACT

Techniques for modifying application behavior at run-time are disclosed. The application behavior is controlled as a function of an application definition schema that is deployed and maintained independently of the application. The application definition schema maps tasks to operations, object types, layouts, and/or fields. A change in the application definition schema results in a change, for example, in the operations performed by an application to complete a task.

23 Claims, 9 Drawing Sheets

(56) References Cited

U.S. PATENT DOCUMENTS

| | | | | |
|---|---|---|---|---|
| 7,620,936 B2* | 11/2009 | Ernst | ............... | G06F 16/289 |
| | | | | 717/108 |
| 7,788,238 B2* | 8/2010 | Gabriel | ............... | G06Q 10/10 |
| | | | | 717/116 |
| 8,478,616 B2* | 7/2013 | De Klerk | ............... | G06Q 10/10 |
| | | | | 705/348 |
| 8,966,465 B2* | 2/2015 | Konduri | ............... | G06F 8/71 |
| | | | | 715/255 |
| 9,753,744 B1* | 9/2017 | Wells | ............... | G06F 9/451 |
| 11,159,404 B1* | 10/2021 | Kuo | ............... | H04L 43/065 |

OTHER PUBLICATIONS

Albrecht et al, "Software Function, Source Lines of Code, and Development Effort Prediction: A Software Science Validation", IEEE, pp. 639-648 (Year: 1983).*

Hicks et al, "Dynamic Software Updating", ACM, pp. 13-23 (Year: 2001).*

Xu et al, "Testing Web Services by XML Perturbation", IEEE, pp. 1-10 (Year: 2005).*

Cavalieri et al, "Updating XML Schemas and Associated Documents through EXup", IEEE, pp. 1320-1323 (Year: 2011).*

Weber et al, "Managing Technical Debt in Database Schemas of Critical Software", IEEE, pp. 43-46 (Year: 2014).*

Qiu et al, "An Empirical Analysis of the Co-evolution of Schema and Code in Database Applications", ACM, pp. 125-135 (Year: 2013).*

Tang et al, "Towards Schema-Based, Constructivist Robot Learning: Validating an Evolutionary Search Algorithm for Schema Chunking", IEEE, pp. 2837-2844 (Year: 2008).*

\* cited by examiner

RUN-TIME MODIFICATION OF AN APPLICATION DEFINITION SCHEMA THAT CONTROLS THE BEHAVIOR OF A SOFTWARE APPLICATION

TECHNICAL FIELD

The present disclosure relates to modifying an application at run-time by modifying an application definition schema. In particular, the present disclosure relates to customizing and updating applications using an application definition schema.

BACKGROUND

A system may execute a software application to generate, store, edit, process, delete, and present data. Executing a software application includes executing a set of operations defined by the software application. The set of operations defined by the software application may need to be modified to incorporate new or improved functionality. The set of operations may need to be modified to customize the software application for a particular purpose or use. The set of operations may need to be modified to address security concerns.

Modifying a software application typically involves re-installing an updated version of the software application. The execution of an initial version of the software application is terminated, temporarily stopping all services and functionality corresponding to the software application. An updated version of the software application is then installed to completely replace all files of the initial version of the software application. Alternatively, files corresponding to the initial version are replaced or modified to generate the updated version of the software application. The updated version of the software application is then executed to resume services and functionality.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MODIFYING AN APPLICATION AT RUN-TIME
4. EXAMPLE EMBODIMENT OF USER INTERFACE FOR MODIFYING APPLICATION AT RUN-TIME
5. COMPUTER NETWORKS AND CLOUD NETWORKS
6. MISCELLANEOUS; EXTENSIONS
7. HARDWARE OVERVIEW

1. General Overview

One or more embodiments execute tasks in accordance with an application definition schema. A software application selects actions/behavior based on a corresponding application definition schema. As an example, the software application may determine how to execute a task based on a corresponding application definition schema. Specifically, responsive to determining that the application definition schema maps the task to a particular set of operations, the software application executes the particular set of operations. Similarly, the software application may access a corresponding application definition schema to select fields/layout for display, and determine object types to be accessed for performance of a task.

One or more embodiments deploy an application definition schema, for controlling the behavior of a software application, independently of that software application. The system may deploy an initial version of the application definition schema to define an initial behavior for a software application. The system may later deploy a modified version of the application definition schema to modify the behavior of the software application. The subsequent deployment of the modified version of the application definition schema may not necessarily require any changes to the software application itself. Furthermore, the software application may be configured to select behavior based on the modified version of the application definition schema, instead of the initial version of the application definition schema, at run-time without any termination or restart of the software application. In an example, an API command corresponding to the software application may be invoked with a parameter value that references the modified version of the application definition schema.

One or more embodiments described in this Specification and/or recited in the claims may not be included in this General Overview section.

2. System Architecture

Figure 1A:
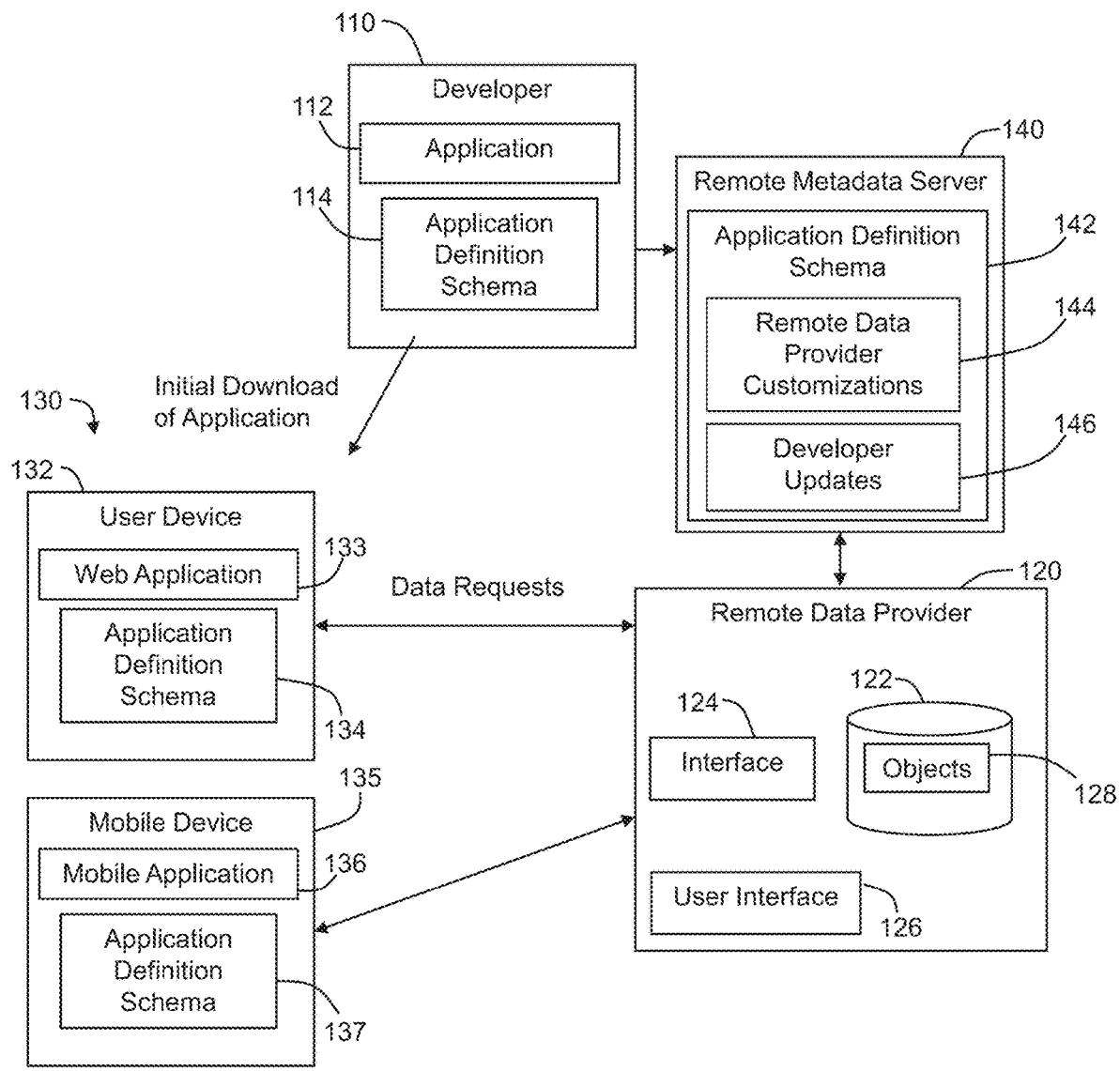
FIGS. 1A and 1B illustrates a system in accordance with one or more embodiments.

FIG. 1A illustrates a system 100 in accordance with one or more embodiments. As illustrated in FIG. 1, system 100 includes a developer 110, a remote data provider 120, and one or more end user devices 130. The developer 110 develops an application 112 and an application definition schema 114. The application definition schema 114 is separate from the application 112 and defines actions and behaviors of the application. Since the application definition schema 114 is stored separately from the application 112, In the embodiment in FIG. 1, the end user devices 130 include a user device 132 running the application 112 as a web application 133 and a mobile device 135 running the application 112 as a mobile application 136. The user devices 130 may obtain the application 112 and application definition schema 114 from the developer 110 directly or indirectly. For example, the developer 110 may provide the application 112 in an application store. Alternatively, the remote data provider 120 running a remote metadata server 140 may store copies of the application 112 and may provide the application 112 and application definition schema 114 to user devices 130 that connect to the remote data provider 120.

The application definition schema 114 includes information which is accessed by the application 112 to define actions and behaviors of the application 112. In one embodiment, the application 112 may run as either the web application 133 or the mobile application 136 according to the definitions in the application definition schema 114. For example, the application definition schema 114 may include a one set of view settings which, when accessed by the application to be run by the user device 132 to provide one set of views for a user interface for the web application 133. The application definition schema 114 may include another set of view settings to be run by the user device mobile device 135 to provide another set of views for a user interface for the mobile application 136.

In another embodiment, the application definition schema 114 may include a one set of types defining objects stored by the remote data provider 120 to be accessed by the web application 133. The application definition schema 114 may include another set of types to be accessed by the mobile application 136.

In one or more embodiments, the application definition schema 114 is an initial version. When the end user devices 130 satisfy a predetermined criterion, the end user devices 130 may receive via the remote data provider 120 the application definition schema 142, which may be a modified version. For example, the application definition schema 142 may include customizations 144 made to the application definition schema by the remote data provider 120, as well as updates 146 to the application definition schema from the developer 110. The modified version of the application definition schema 142 is processed by the end user devices 130 to reconfigure the applications 133 and 136. Reconfiguring the applications 133 and 136 results in changing the actions and behaviors of the applications 133 and 136. In one embodiment, the applications 133 and 136 are reconfigured without terminating or restarting the applications 133 and 136.

In one or more embodiments, when the end user devices 130 send data requests to the remote data provider 120, the remote data provider 120 accesses the remote metadata server 140 and updates the application definition schemas 134 and 137 with the version of the application definition schema 142 stored in the remote metadata server 140. In addition, or in the alternative, the remote data provider 120 may update the application definition schemas 134 and 137 when the web application 133 or mobile application 136 performs a particular action, such as changing from one view to another or changing from running in the foreground to running in the background.

In one or more embodiments, the remote data provider 120 has the capability of customizing the application definition schema 142. For example, a user interface 126 receive a user input to access the remote metadata server 140 via the remote data provider 120 to customize the application definition schema 142. In one embodiment, customizing the application definition schema 142 includes altering one or more operations to be performed by applications running an application based on the application definition schema. In one embodiment, customizing the application definition schema 142 includes modifying one or more object types, which changes objects accessible by applications from the data repository 122 of the remote data provider 120.

In embodiments of the invention, customizing the application definition schema 142 changes the functionality of the application by changing functions that the application can perform. For example, when the user device 132 downloads the application 112 from the developer 110, the user device 132 may run the application 112 as a web application 133 having a functionality that allows the web application 133 to perform a task by executing one set of operations. After receiving the updated application definition schema 142 from the remote data provider 120, the web application 133 performs the task by executing a different set of operations.

Figure 1B:
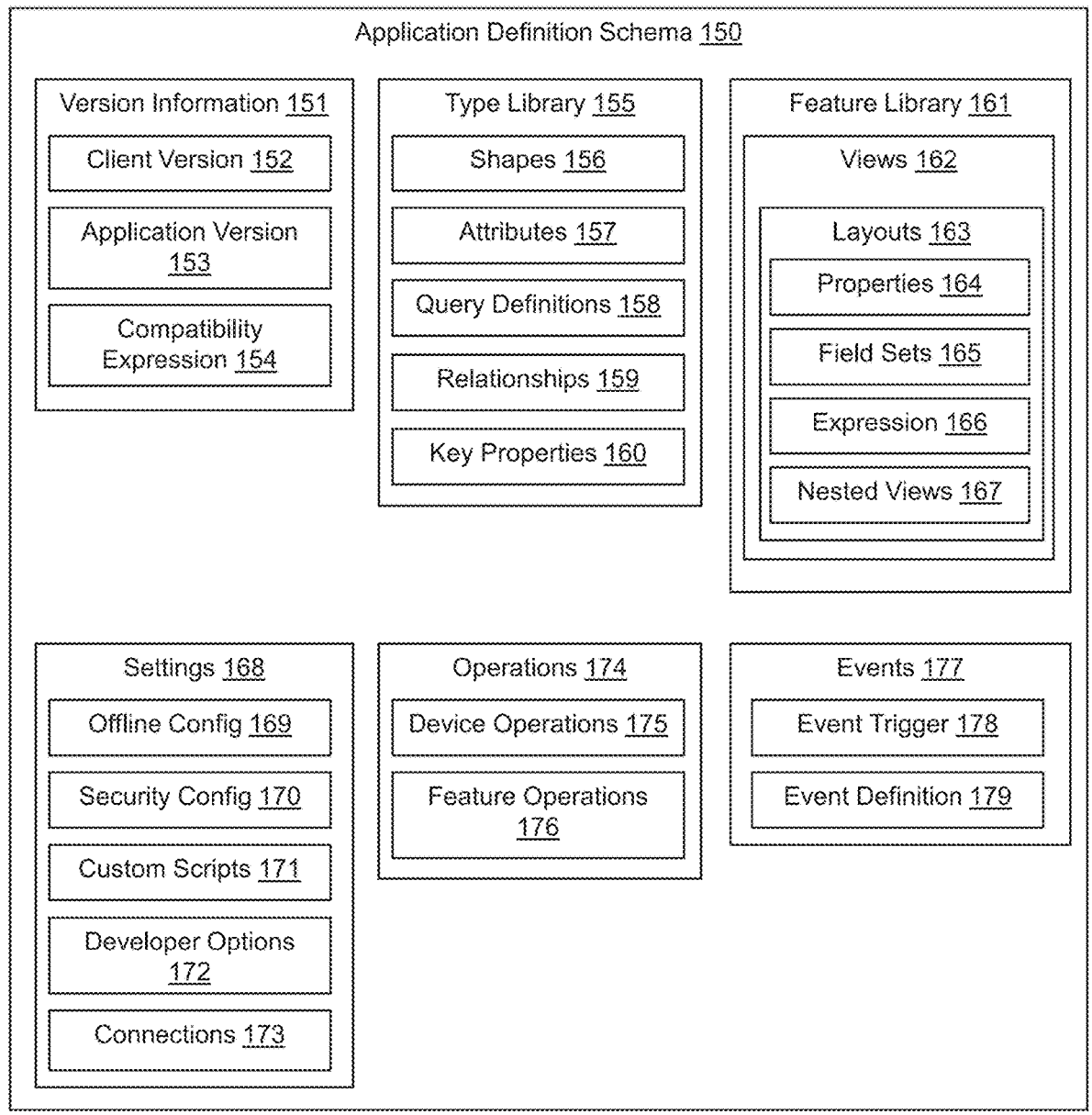

FIG. 1B illustrates an example of an application definition schema 150 according to one or more embodiments. The application definition schema 150 may correspond to any one of the application definition schemas 114, 142, 134, and 137. For example, the developer 110 may develop the application 112 having the application definition schema 114 that includes version information 151, a type library 155, a feature library 161, settings definitions 168, operations definitions 174, and events definitions 177. The application 112 may be downloaded and run by the end user devices 130. The application definition schema 114 may be provided to the remote data provider 120 to be stored in the remote metadata server 140. A user interface 126 of the remote data provider 120 may receive a user input to alter contents and definitions within the version information 151, a type library 155, a feature library 161, settings definitions 168, operations definitions 174, and events definitions 177 to create a custom application definition schema 142. For example, the user interface 126 may receive a user input to add or remove one or more object types to/from the type library 155. The user interface 126 may receive a user input to add, remove, or alter one or more shapes 156 corresponding to an object type in the type library 155. The user interface 126 may receive a user input to add, remove, or alter one or more device operations 175 in the operations list 174 to define operations a device may perform. Upon altering the contents of the application definition schema 142, the remote data provider 120 sends the updated application definition schema 142 to the end user devices 130. The application definition schemas 134 and 137 of the user device 132 and the mobile device 135 are updated, respectively, by the updated application definition schema 142.

As illustrated in FIG. 1B, the application definition schema 150 includes version information 151, a type library 155, a feature library 161, a settings list 168, an operations list 174, and an events list 177.

The version information 151 includes a client version 152, an application version 153, and a compatibility expression 154. The client version 152 is a value that is modified each time the client, such as the remote data provider 120, modifies the application definition schema 150. The application version 153 is a is a version number of a corresponding application that is controlled by the Application Definition Schema 150. The application version 153 may be used, for example, as an input value to select an operation from a set of candidate operations executable by the application.

The compatibility expression 154 includes information identifying the extent to which the present version of the application definition schema is compatible with previous versions and with the developer version.

The type library 155 is a library of object types the application 112 recognizes. Each "object type" in the type library 155 corresponds to one object, such as an object stored in the data repository 122 of the remote data provider 120. Each object type in the type library 155 defines how the object appears in the context of the application.

For example, the data repository 122 of the remote data provider 120 includes objects, such as data structures having multiple fields of data. Examples of object types include "accounts," "contacts," "opportunities," "leads," "appointments," "buildings," "territories," "employees," and "departments." An object type "accounts" defines what an account will look like in the context of the application 112.

The type library 155 includes shapes 155, attributes 157, query definitions 158, relationships 159, and key properties 160.

Each object type may have multiple shapes 156. An object's shape defines how the object is represented in a particular application. For example, an application definition schema 150 may have an initial object type shape to be applied by the web application 133 and a modified object type shape, different from the initial object type shape, to be applied by the mobile application 136. When the web application 133 queries the remote data provider 120 to access the object stored in the data repository 122, the remote data provider 120 may return a different set of data contained in the object than when the mobile application 136 queries the remote data provider 120 to access the object in the data repository 122. In one example, the object may be a data structure and returning different sets of data may include returning different fields from the data structure to be accessed or displayed by the applications 133 and 136, respectively.

Attributes 157 define characteristics of an object type. For example, one attribute may define required information for fields of a particular object type. Attributes 157 may define default values for fields of an object type. Attributes 157 may define whether a particular set of fields of an object type is sortable.

Attributes 157 may include display attributes which define which fields from an object will appear in different contexts when the application is running. Typically, an application has heterogeneous views, or views that show a record across multiple different objects. Attributes 157 defines which fields of an object will be displayed heterogeneously and in what context those fields will be displayed.

Query definitions 158 define what the application will display to a user when a particular query is executed by the application. For example, a query definition 158 may define a particular set of fields of an object to be returned to an application when the application sends a particular query to the remote data provider 120. The query definition 158 may also define how the returned fields are displayed—such as an order of the fields or an arrangement of the fields on a display of an end user device.

Relationships 159 define how two object types are related to each other. A relationship 159 of an object type may define a relationship between one object type and another as a "one-to-many" type relationship, a "one-to-one" relationship, a "many-to-one" relationship, or any other pre-defined relationship. As an example, if one object type is an "account" and another is an "opportunity," the relationship 159 may define a "one-to-many" relationship between "account" and "opportunity," to define an account-type record from and "account" object as corresponding to multiple different opportunity-type records from an "opportunity" object.

Key properties 160 are identification values that identify the object and may also include access levels for the object.

The feature library 161 of the application definition schema 150 defines the user interface (UI) an end user will interact with when running the application. Each feature in the feature library 161 is an array and may have multiple views 162. Each view 162 defines a particular visual layout for displaying information on an end user device 130. For example, each view 162 may be a JavaScript Object Notation (JSON) object. Each view 162 includes layouts 163 defining how elements in the visual display are arranged relative to each other in a particular region of the view 162. A view 162 may have multiple layouts 163, each corresponding to a different region of a display. In addition, as discussed below, a layout 163 may be configured to be conditionally displayed by an application, only when predetermined criteria are satisfied.

In one embodiment, a layout 163 is an array, including one or more properties 164, field sets 165, expressions 166, and definitions of nested views 167.

Properties 164 may include a setting defining geographic regions in which an application may have access to a particular layout. Properties 164 may include a definition as to whether the layout is stale or active. A stale layout may not be visible to any application. A layout designated as active is visible to applications that meet pre-defined criteria. Properties 164 may define a "default" layout. For example, a view 162 may have four different layouts 163. Three of the layouts may be configured to be displayed only when particular criteria are met. The "default" layout may be displayed when none of the criteria are met for displaying the other three layouts.

Properties 164 may define content in the layout. For example, properties 164 may define which fields are displayed in a layout and how those fields are arranged on a display.

Properties 164 may define actions displayed in the layout. Actions may include icons that, when selected by a user running the application, perform particular tasks. For example, an action for a layout displaying fields in an "appointments" object may include an icon to allow a user to schedule an appointment or an icon to contact an employee associated with the appointment.

Properties may also define "children" displayed in the layout. "Children" is a term for related content. For example, a particular layout may display information for one object, and the layout may display information from two related objects. As one example, if a layout is designed to show fields from an "accounts" object, the layout may also show fields from a "leads" objects related to the "accounts" object, and from a "territories" object related to the "accounts" object.

Expressions 166 define pre-defined criteria to be met for a layout to be visible to a running application. For example, an object may include one field storing a value that defines a "forecast." An expression 166 may include a rule that "if the value of the 'forecast' field for a particular record is greater than a threshold value, a particular layout is available to an application. If the value of the 'forecast' field is less than or equal to the threshold value, the particular layout is not available to the application." In other words, expressions 166 define rules governing when a layout is available to a running application.

Field sets 165 define groupings of displayed fields. For example, if the layout is configured to display fields from an "accounts" object, a field set 165 may group all the contact information for a contact of the account in one region of a display. The field sets 165 may be configured to group all open service requests for the account in another region of the display.

Nested views 167 define instances in which one view is nested within another view.

The settings definitions 168 define how the application governs itself at run-time.

An offline configuration setting 169 defines whether the application can be run offline, or whether the application requires a connection to another device or system, such as a connection to the remote data provider 120, to run the application. The offline configuration setting 169 may define particular features that are available when the application is offline. For example, the application may connect to a third-party application that performs a business-card scanning function. The offline configuration settings 169 may define whether the application is permitted to use the third-party application features when the application is offline.

Security configuration settings 170 may include security information, including access levels of users that are required to access an application or particular features of the application.

Custom scripts 171 include any scripts generated by an administrator that may be used in implementing an application definition schema.

Developer options 172 includes capabilities and functions provided by the developer that may optionally be implemented by a user, or by an administrator of an enterprise system supporting one or more users.

Connections 173 includes information to allow the application to connect with devices, systems, and networks outside of the device on which the application is running.

Operations definitions 174 define operations that may be performed by devices running the application. Device operations 175 define how an application will interact with a device to perform a task. Feature operations 176 define how a display device will visually depict a user interface during run-time.

An example of a device operation 175 is querying, by an application running on a user device 130, the remote data provider 120 to access an object stored in the data repository 122. The device operation 175 associated with the query may perform operations of receiving a user input from a graphical user interface (GUI), accessing the type library 155 to determine a query to be transmitted, accessing the feature library 161 and feature operation definitions 176 to determine any changes to a GUI based on the user selection, controlling the user device to transmit the query, obtaining a response to the query, and accessing the feature library 161 and feature operations definitions 176 to determine how to display the fields received as a result of the query.

Another example of a device operation 175 is an imaging operation in which the application running on the device controls the device to obtain an image of an object, such as a business card or other document. An imaging operation may include receiving a user input from a GUI, accessing the type library 155 to determine any attributes of an object corresponding to the imaging operation (such as a "contacts" object type, in an example in which the imaging operation is the scanning of a business card), accessing the feature library 161 and feature operation definitions 176 to determine any changes to the GUI based on the user selection, controlling the user device to obtain the image of the object, obtaining image data in response to the imaging operation, accessing a third party application to convert the image data to text data, and accessing the feature library 161 and feature operations definitions 176 to determine how to display the fields corresponding to the text data.

Another device operation 175 may be to create a new object type and store the object types in the type library 155.

Feature operations 176 define operations performed by a user interface. For example, a feature operation may include changing a view of a GUI based on user input. Another example of a feature operation is to change an arrangement of GUI elements on a display as a result of a user input or as a result of a device operation 175 being performed.

Events 177 may be associated with corresponding event triggers 178 and event definitions 179. Event definitions 179 include a set of one or more operations to be performed by an application in response to an event trigger 178. As an example, a user input, such as a mouse click of an icon in a user interface, may trigger an event. The event may be performing one or more tasks or operations or accessing one or more objects stored in a remote data provider 120. As another example, an event trigger may be the application reaching a certain stage, such as an elapsed time period.

In one or more embodiments, the system 100 may include more or fewer components than the components illustrated in FIGS. 1A and 1B. The components illustrated in FIGS. 1A and 1B may be local to, or remote from, each other. The components illustrated in FIGS. 1A and 1B may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, a data repository 122 is any type of storage unit and/or device (e.g., a file system, database, collection of tables, or any other storage mechanism) for storing data. Further, a data repository 122 may include multiple different storage units and/or devices. The multiple different storage units and/or devices may or may not be of the same type or located at the same physical site. Further, a data repository 122 may be implemented or may execute on the same computing system as the remote data provider 120. Alternatively, or additionally, a data repository 122 may be implemented or executed on a computing system separate from the remote data provider 120. A data repository 120 may be communicatively coupled to the remote data provider via a direct connection or via a network.

Information describing objects 128 may be implemented across any of components within the system 100. However, this information is illustrated within the data repository 122 for purposes of clarity and explanation.

In one or more embodiments, a remote data provider 120 refers to hardware and/or software configured to perform operations described herein for storing objects and customizing an application definition schema. In one or more embodiments, the end user devices 130 refer to hardware and/or software configured to perform operations described herein for running an application based on an application definition schema that has a functionality that is changed at run-time. Examples of operations for running an application based on an application definition schema are described below with reference to FIGS. 2 and 3.

In an embodiment, the user devices 130, remote data provider 120, and remote metadata server 140 are each implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the end user devices 130 include hardware and/or software configured to facilitate communications between a user and the remote data provider 120. The applications 133 and 136 render user interface elements and receive input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the applications 133 and 136 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, user interfaces of the applications may be specified in one or more other languages, such as Java, C, or C++.

3. Modifying Application Behavior at Run-Time

Figure 2:
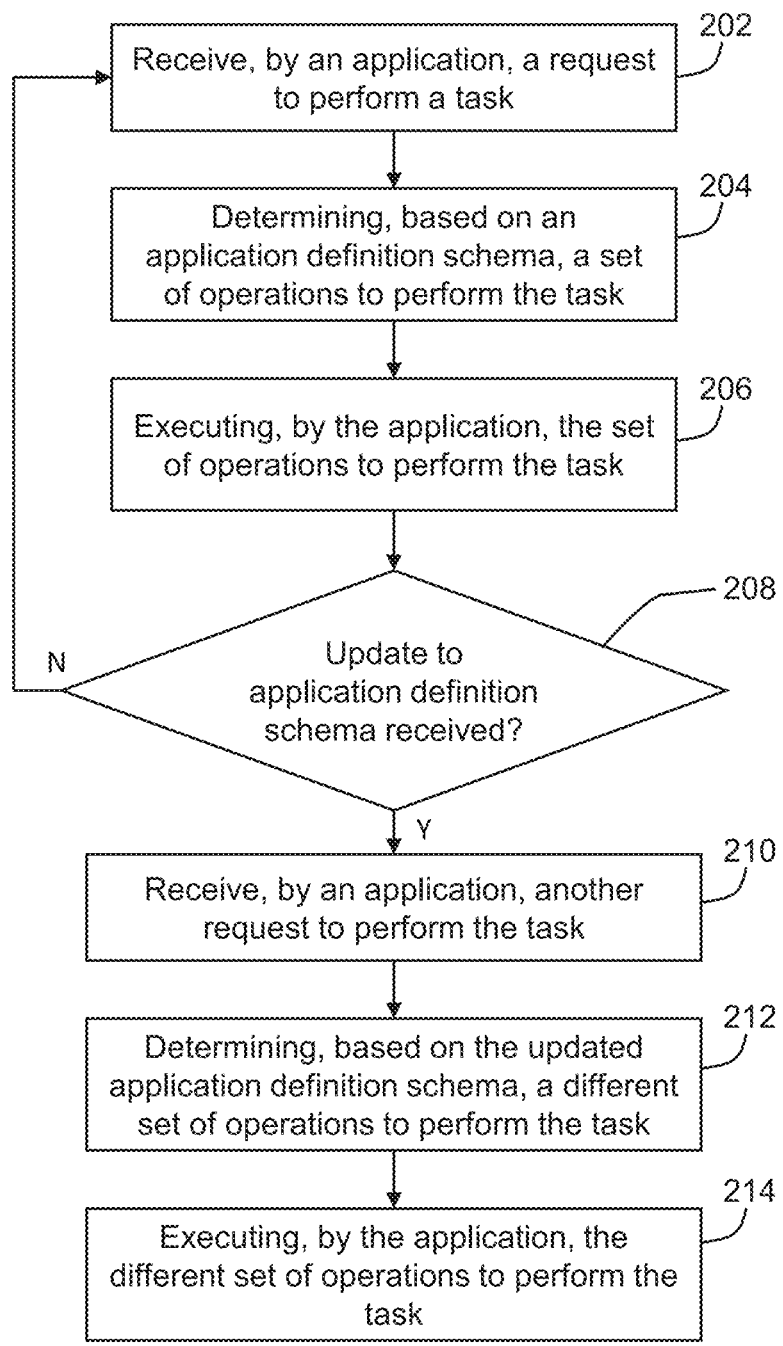
FIG. 2 illustrates an example set of operations for modifying an application in accordance with one or more embodiments.

FIG. 2 illustrates an example set of operations for modifying application behavior at run-time based on an updated application definition schema in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

An application receives a user request to perform a task (Operation 202). The application may be running on a user device, such as a mobile device. In such a case, the application may be a mobile application. In addition, or in the alternative, the application may be running as a web application on a user device. In one embodiment, receiving the request to perform the task includes detecting a user interaction with a display element. The user interaction with the display element may initiate performance of the task by the application on the user device.

The application determines, based on an application definition schema, a set of operations to perform the task (Operation 204). The set of operations may be selected from among a candidate set of operations that the application is capable of performing. In other words, the application definition schema may include definitions of many different operations the application is capable of performing. In addition, the application may analyze the requested task to determine which of the candidate operations corresponds to the requested task.

The application executes the set of operations to perform the task (Operation 206). Executing the set of operations may include, for example: providing a visual display on a GUI; identifying an object type associated with the task; generating a query to an external data provider; receiving a response to the query; and generating a visual display to display results of the query. In another example, executing the set of operations may include: identifying an object type associated with the request; identifying fields of the object type associated with the request; displaying the fields; receiving user input in one or more of the fields; and providing the user input to corresponding fields of an object in a remote data provider.

The application determines if an update has been received to the application definition schema (Operation 208). In one or more embodiments, a developer of the application may update the application definition schema to change what the application is capable of performing. In addition, or in the alternative, the application may be managed by an organization, such as a company or enterprise, and the enterprise may customize the application definition schema to provide functionality for the application that differs from a version provided by the developer of the application.

In one or more embodiments, an event may trigger updating the application definition schema. For example, in one or more embodiments, an application communicates with a remote data provider to obtain data for the application at run-time. The remote data provider may compare a version number of the application definition schema being run by the application with a version number of an application definition schema stored in a remote metadata server. The application definition schema stored in the remote metadata server may include the most recent customizations to the application definition schema made by the remote data provider. The application definition schema stored in the remote metadata server may also include the most recent updates to the application definition schema provided by a developer of the application. The remote data provider sends an update to the end user device to update the application definition schema in the end user device based on determining that the version number stored in the remote metadata server differs from the version number in application definition schema stored in the end user device.

Comparing the version numbers may be triggered based on any predefined event, including: receiving a request from an application stored in a user device; determining that the application definition schema in a remote metadata server has been updated; detecting, by an application running on a user device, a predetermined view, such as the application being switched between running in the foreground and running in the background; and determining that a predetermined period of time has elapsed since a last update.

In one or more embodiments, the update to the application definition schema changes the functionality of the application by changing what the application can perform. For example, in one embodiment, the set of operations to perform the task includes requesting a first set of data from an object stored by a remote data provider and providing fields on a display to display only the first set of data from the object. However, updating the application definition schema may give the application the ability to request and display a second set of data from the object that was not a part of the first set of data. Alternatively, the update to the application definition schema may remove from the application the ability to display a subset of data within the first set of data that the application was previously able to request and display.

If an update is received to the application definition schema (Operation 208), the operation definition schema stored in the device running the application is modified based on the update. While FIG. 2 provides an example in which an update to the application definition schema is received after executing a set of operations, in one or more embodiments, an application checks for an update at any time in the process, such as after receiving the request to perform the task (Operation 202, Operation 210).

Subsequent to updating the application definition schema, the application again receives a request to perform the task (Operation 210). For example, a user may interact with a displayed user interface in the same manner as in Operation 202 to request performance of the task. As one example, a user may select an icon to perform a task. In one embodiment, the icon selected by the user in Operation 202 to request the application to perform the task is the same as the icon selected by the user in Operation 210. In one or more embodiments, the updated application definition schema results in a reconfiguration of the application at run-time, without terminating or restarting the application. In an example, an API command corresponding to the software application may be invoked with a parameter value that references the modified version of the application definition schema.

The application determines, based on the updated application definition schema, that the task is to be performed with a different set of operations (Operation 212). Upon detecting the request, the application refers to the application definition schema to determine the operations to be performed to fulfill the task. Example operations include: formulating a query to transmit to a remote data provider; receiving results from the remote data provider; determining GUI elements to display the results of the query; and populating the GUI elements with the results of the query.

The application executes the task using the different set of operations (Operation 214). In one embodiment, the different set of operations includes at least one operation that the application was not capable of performing prior to the update to the application definition schema. In another embodiment, the different set of operations does not include at least one operation that the application performed when executing the task in Operation 206. In one embodiment, updating the application definition schema (Operation 208) changes the set of operations the application is capable of executing to perform the requested task.

Figure 3:
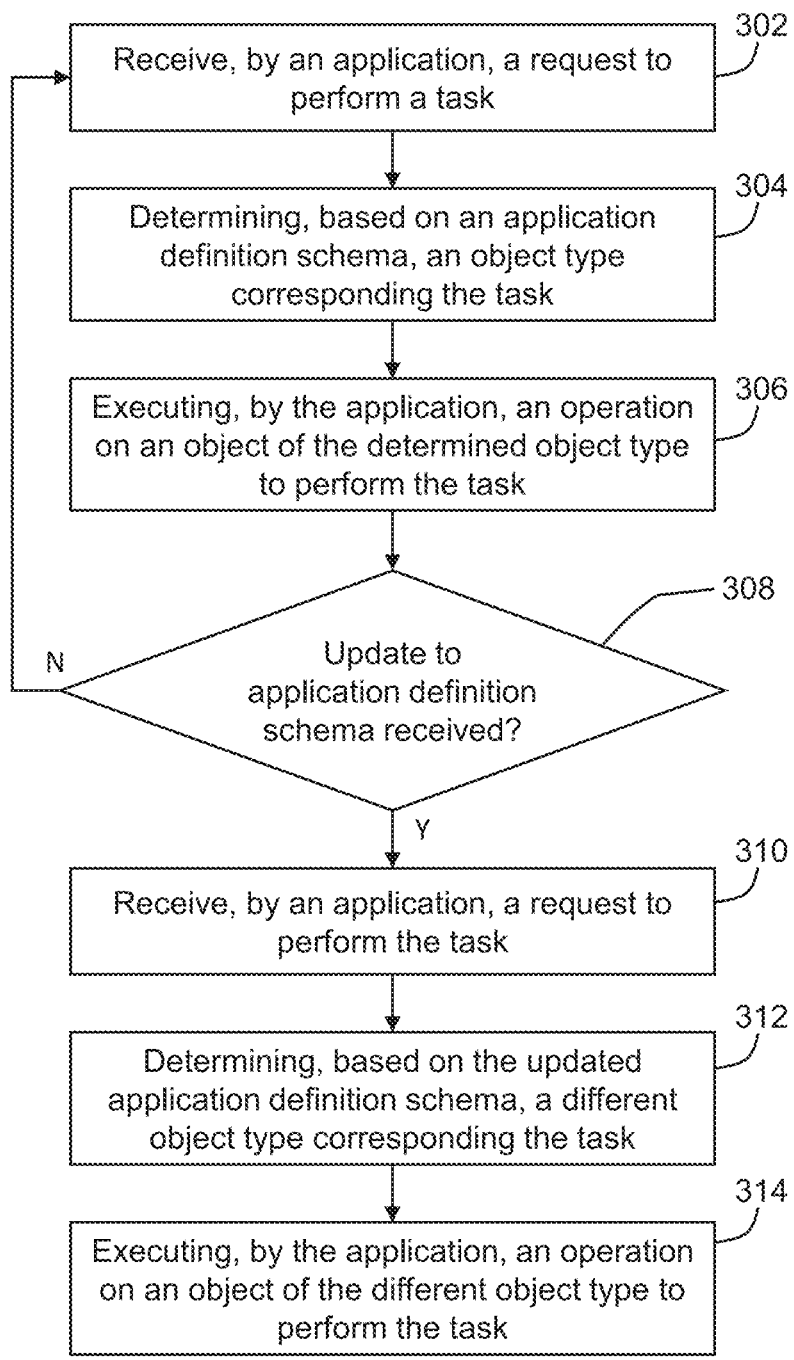
FIG. 3 illustrates an example set of operations for modifying an application in accordance with one or more embodiments.

FIG. 3 illustrates an example set of operations for modifying an application based on an application definition schema at run-time in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

An application receives a user request to perform a task (Operation 302). The application may be running on a user device, such as a mobile device. In such a case, the application may be a mobile application. In addition, or in the alternative, the application may be running as a web application on a user device. In one embodiment, receiving the request to perform the task includes receiving a user interaction with a display element. The user interaction with the display element may initiate performance of the task by the application on the user device.

The application determines, based on an application definition schema, an object type corresponding to the task (Operation 304). For example, in one embodiment, an object is a data structure stored in a remote data provider. The object type in the application definition schema defines how the application portrays the object to a user on the user device.

The application executes an operation on the object of the determined object type to perform the task (Operation 306). In one embodiment, the application generates a query to query a data store that stores the object. The scope of the query is defined by the application definition schema. In one or more embodiments, the application receives results from the query and displays the results to a user in a manner defined in the application definition schema.

The application determines if an update has been received to the application definition schema (Operation 308). In one or more embodiments, a developer of the application may update the application definition schema to change what the application is capable of performing. For example, the developer may change an object type to be accessed based on a requested task of the application. In addition, or in the alternative, the application may be managed by an organization, such as a company or enterprise, and an administrator may customize the application definition schema to provide functionality for the application that differs from a version provided by the developer of the application. For example, the administrator may change the object type accessed by the application to perform the task.

In one or more embodiments, the update to the application definition schema changes the functionality of the application by changing objects the application can access to perform a task. For example, in one embodiment, the task includes referring to an object type in the application definition schema to access and display data from an object stored by a remote data provider and providing fields on a display to display the data from the object. However, updating the application definition schema may add a different object type to the application definition schema. The new object type may give the application the ability to request and display data from a new object that was not previously available to the application. Alternatively, the update to the application definition schema may remove from the application the ability to access an object that had previously been available to the application.

If an update is received to the application definition schema (Operation 308), the operation definition schema stored in the device running the application is modified based on the update. While FIG. 3 provides an example in which an update to the application definition schema is received after executing a set of operations, in one or more embodiments, an application checks for an update at any time in the process, such as after receiving the request to perform the task (Operation 302, Operation 310).

Upon updating the application definition schema, the application again receives a request to perform the task (Operation 310). For example, a user may interact with a displayed user interface in the same manner as in Operation 302 to request performance of the task. As one example, a user may select an icon to perform a task. In one embodiment, the icon selected by the user in Operation 302 to request the application to perform the task is the same as the icon selected by the user in Operation 310.

The application determines, based on the updated application definition schema, that the task is to be performed by processing a different object type (Operation 312). Upon detecting the request, the application refers to the application definition schema to determine the object type to be processed to fulfill the task.

The application executes the task by processing the different object type (Operation 314). In one embodiment, the different object type identifies a different object than the object accessed to perform the task in Operation 306. For example, in one embodiment, performing the task in Operation 306 includes processing three object types to access three separate objects from a remote data provider. Performing the task in Operation 314 may include processing four object types to access four separate objects from the remote data provider. Alternatively, performing the task in Operation 314 may include processing only two object types to access two separate objects from the remote data provider. In embodiments of the invention, updating the application definition schema (Operation 308) changes the functionality of the application by changing the objects the application is capable of accessing to perform the requested task.

4. Example Embodiment of User Interface for Modifying Application at Run-Time A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
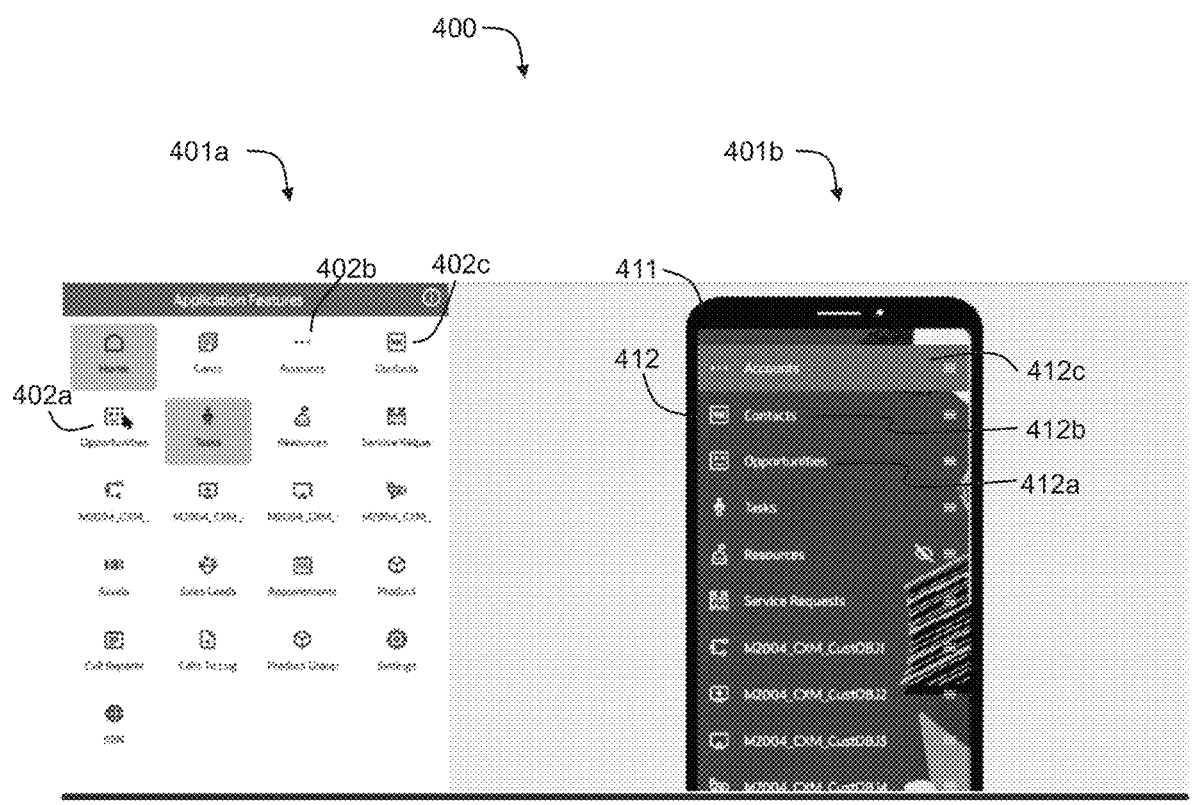
FIGS. 4A to 4D illustrate a user interface for modifying an application in accordance with one or more embodiments.

FIG. 4A is an example of a user interface accessible by an administrator for modifying an application definition schema at run-time according to one embodiment.

The user interface 400 is a graphical user interface (GUI) including a first region 401a is an administrator panel showing features, icons, and objects an administrator may add, delete, or modify. A second region 401b provides a representation of a user device 411 and a user GUI 412 on the user device. For example, an administrator may select "opportunities" 402a, "accounts" 402b, and "contacts" 402c. The are object types that are either present in the application definition or can be added to the application definition schema. If the object types are present in the application definition schema, they may be configured to be inaccessible to the application until the administrator sets attributes of the object type to be accessible to a user.

When the administrator selects the object types 402a, 402b, and 402c, graphical representations of the object types may be displayed on the GUI 412 of the user device 411 running the application. The GUI 412 may include an "opportunities" icon 412a, an "accounts" icon 412b, and a "contacts" icon 412c. The administrator may also control how the icons 412a, 412b, and 412c appear, and in which order they are arranged, in the GUI 412.

Figure 4B:
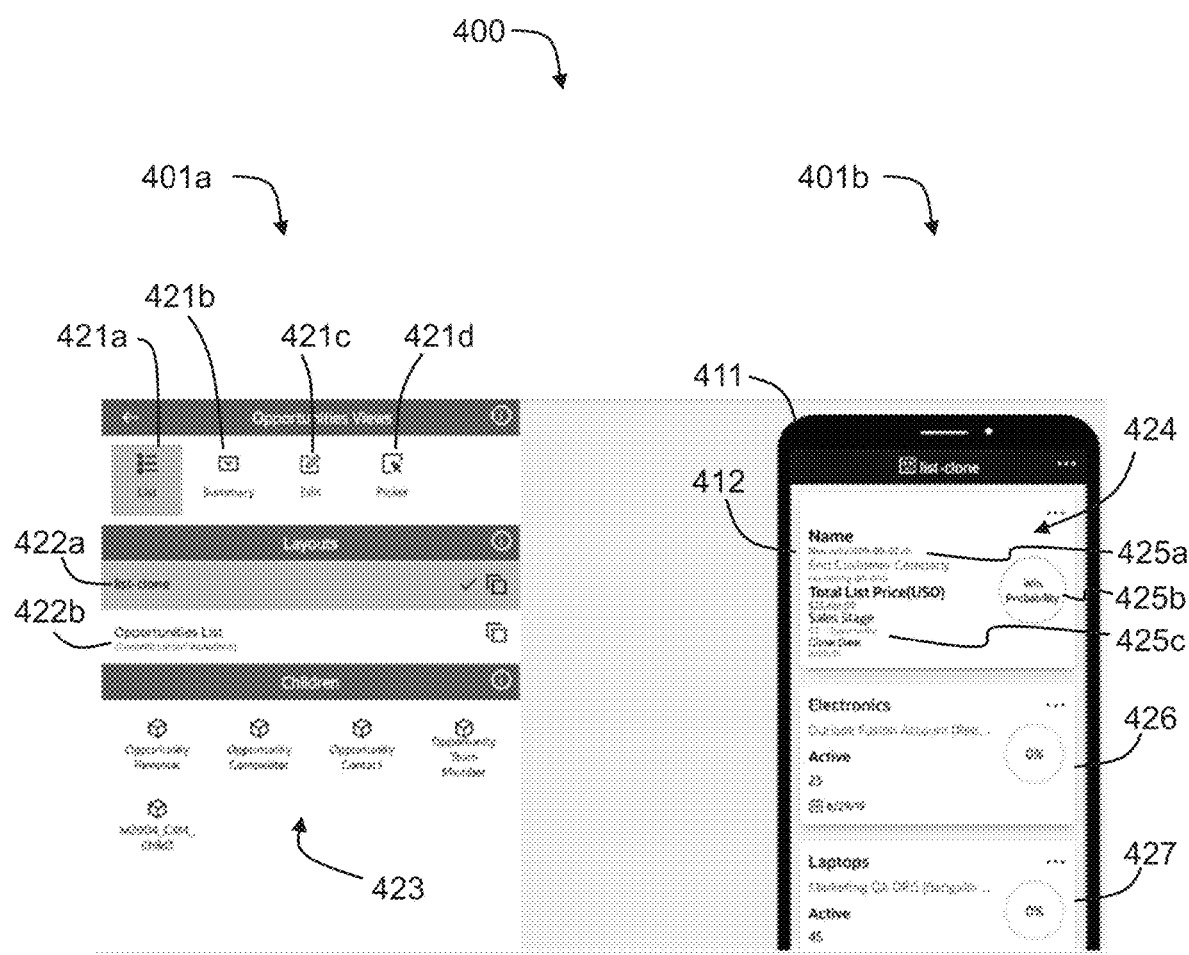

FIG. 4B illustrates an example of a user interface accessible by the administrator to customize aspects of a user interface for an application according to one embodiment. The administrator panel 401a includes icons representing different views available to an application at run-time. These include a "list" view 421a, a "summary" view 421b, an "edit" view 421c, and a "picker" view 421d.

The administrator panel 401a also includes layouts 422a and 422b available to be displayed. For example, the application definition schema may include multiple layouts capable of being displayed to display information associated with object types. The administrator may have the capability to add or remove layouts from the application definition schema. Alternatively, or in addition, the administrator may add or remove layouts from being displayed on a user GUI 412 without removing the layouts from the application definition schema.

The administrator panel 401a also includes "children" 423. Children 423 represent additional object types, other than the selected object type, that may be displayed by a user's GUI at run-time together with the selected object type.

The layouts 422a and 422b determine the data that is displayed, and how the data displayed, in the user GUI 412 of the user device 411. In the example illustrated in FIG. 4B, the layout 422a corresponds to the frame 424 in the user GUI 412. The frame 424 includes fields 425a and 425c corresponding to data from an object. The fields in the frame 424 are displayed in a "list" view. Field 425a corresponds to a "name" field, and field 425c corresponds to a "sales stage" field. Icon 425b may correspond to an action button that, when selected, calculates a probability of winning a bid from the selected "opportunity." The formula for performing the action may be stored in the application definition schema. Alternatively, the formula for performing the action may be stored in a remote data provider data store, and the formula may be accessed or calculated remotely.

The user GUI 412 also displays fields 426 and 427 corresponding to the children 423 selected by the administrator in the administrator interface 420. The fields 426 and 427 display data from objects (named "electronics" and "laptops") that are related to the selected object type.

Figure 4C:
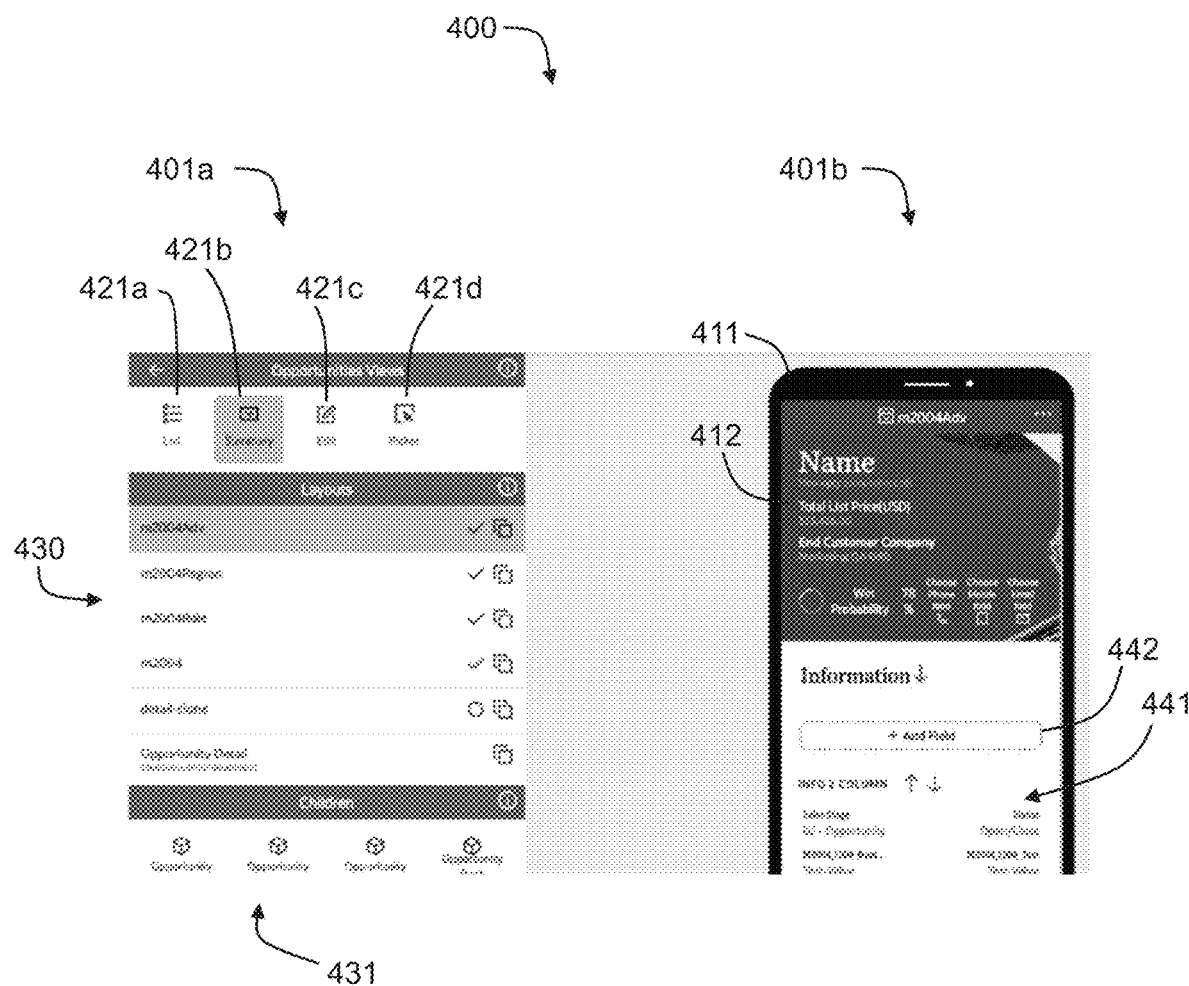

As shown in FIG. 4C, the administrator may also customize an application definition schema by selecting additional views for customization. When the administrator selects the "summary" icon 421b, viewable layouts 430 and children 431 are provided to the administrator.

On the user device 411, the user GUI 412 displays information associated with the same object type as in FIG. 4B, but with alternative configurations and content being displayed, according to the customizations of the administrator. For example, in the user GUI 412 of the "summary" view, additional content 441 associated with an opportunity may be displayed. An action button 442 allowing a user to enter a field may also be displayed. Selecting the action button 442 may allow a user to input data that is stored in a record for the selected "opportunity," where an "opportunity" in the example of FIG. 4B represents a business opportunity for a user to obtain business.

Figure 4D:
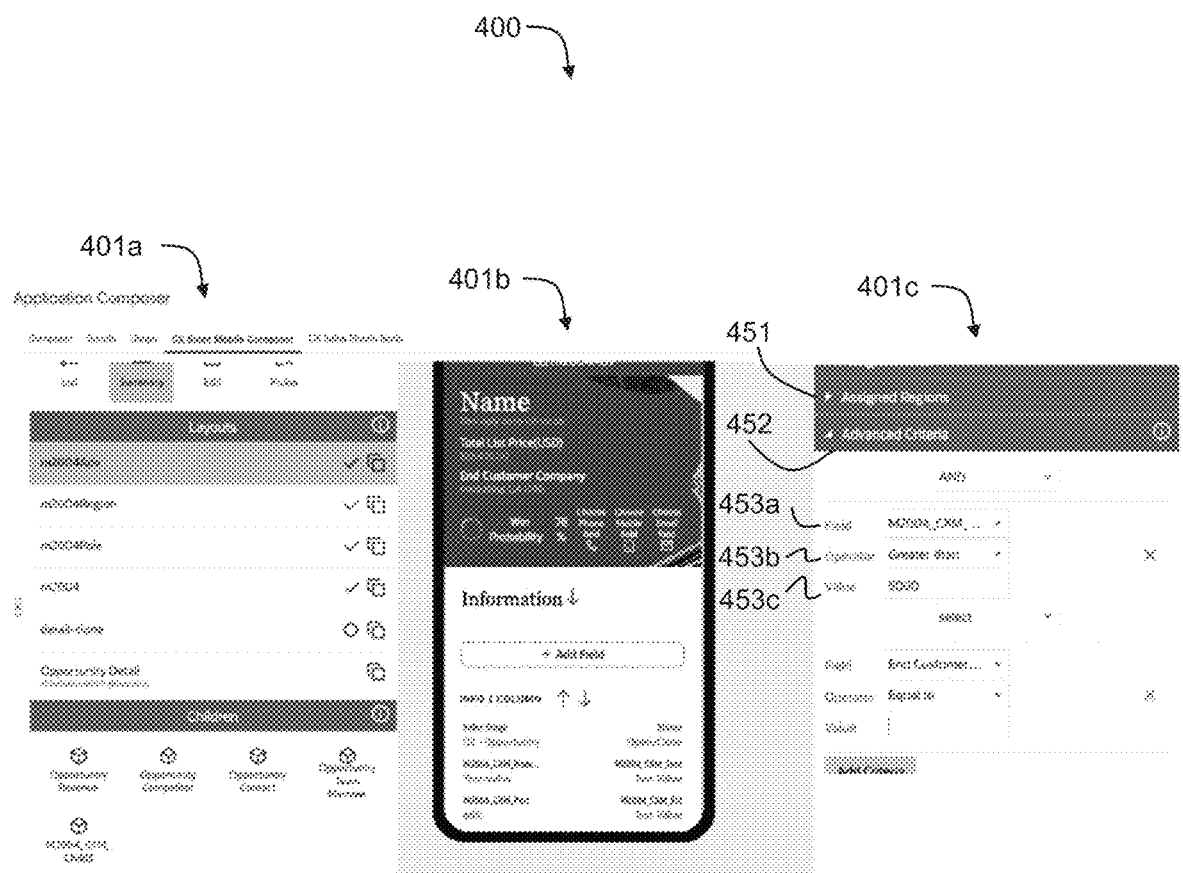

FIG. 4D shows additional criteria and settings that are customizable by an administrator. The user interface 400 includes a settings customization panel 401c that allows the administrator to configure settings and attributes for a given object type and view.

In the example illustrated in FIG. 4D, the panel 401c includes an "assigned regions" tab to allow an administrator to define geographic regions for which a particular view or layout will be visible in the application at run-time.

An "advanced criteria" tab 452 allows the administrator to customize attributes and settings of individual fields in a particular layout for a given object type of an application definition schema. In FIG. 4D, the field "M2004_CXM . . . " 453a is assigned an operator 453b "greater than" and a value 453c "5000." In this manner, the administrator is able to customize a function performed on the field, data displayed in a field, data entered into a field, preconditions for displaying a field, or any other customizable function associated with the field.

In one embodiment, when the administrator completes a customization of the application definition schema, the updated application definition schema is stored in a remote metadata server. The updated application definition schema may be immediately pushed to any number of end user devices running the application associated with the application definition schema. For example, in an embodiment in which the remote data provider is an enterprise or company, the updated application definition schema may immediately be provided to any end user device connected to a computer network operated by the enterprise or company. In an alternative embodiment, the updated application definition schema is sent to the user devices upon a triggering event being performed by the user devices. A triggering event may include, for example, the user device sending a data request to the remote data provider, the user device initiating the application, a user selecting a new view in the application, a user requesting the updated application definition schema, or any other triggering event.

In one embodiment, updating the application definition schema in the user devices changes the functions the application may perform without requiring the user devices or the remote data provider to compile new code. In one embodiment, updating the application definition schema in the user devices does not require the user devices to communicate with the developer or to restart the application. For example, if a user is running the application in a user device, and changing a view in the application triggers a download of the updated application definition schema, the application definition schema in the user device may be updated while the user is still in the application. The functionality of the application may be changed while the user is in the application, such as changing fields of an object type the user may access or display or changing actions a user is capable of performing in the application.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
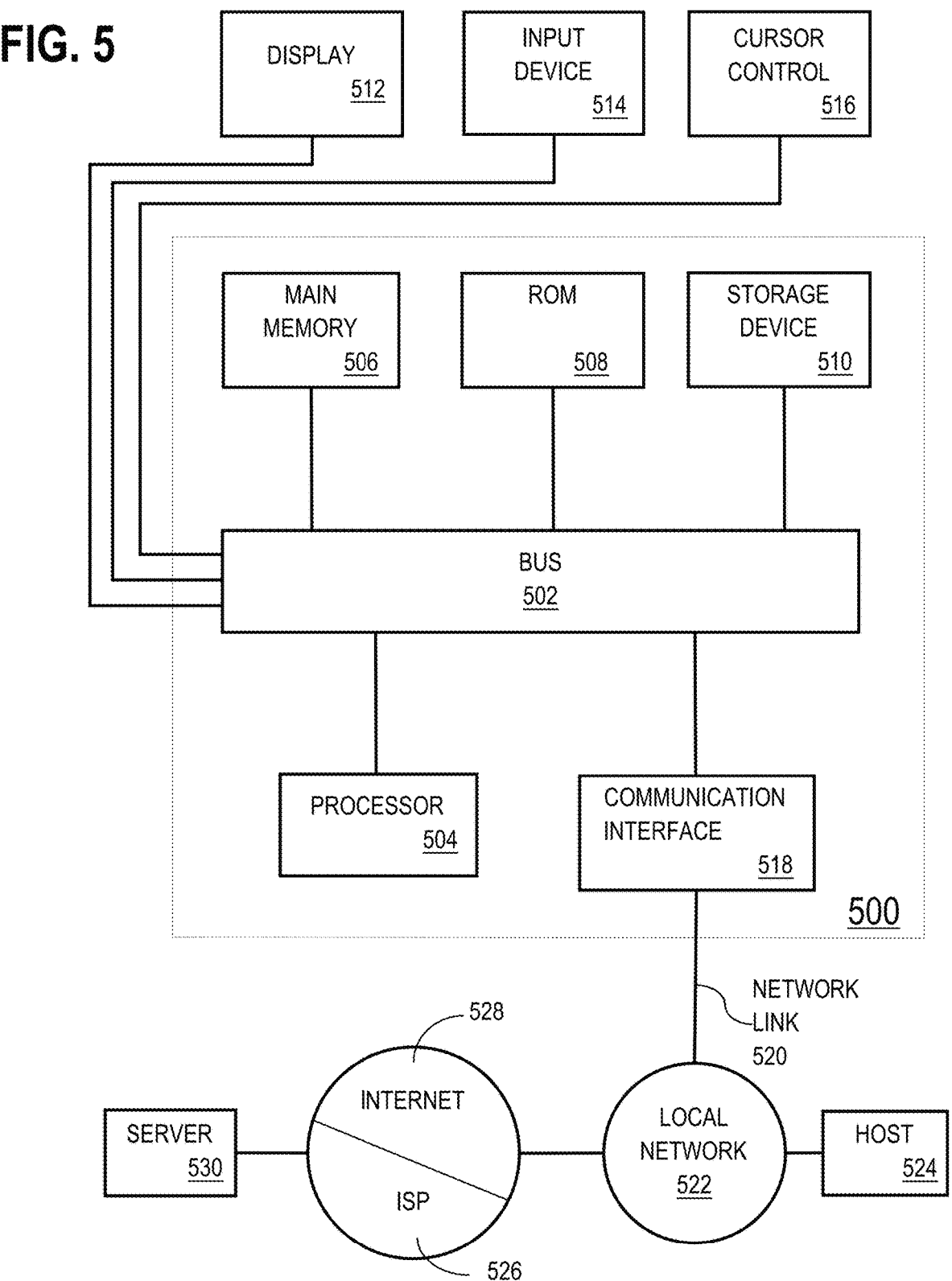
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
specifying, based on an initial application definition schema corresponding to an application, operations for performing any task of the application;
receiving, by the application, a first request to perform a task;
determining, by the application based on the initial application definition schema, a first set of one or more operations, of a first operation type, to perform the task;
executing, by the application, the first set of operations to perform the task;
reconfiguring the application to determine the operations for performing any task based on an updated application definition schema, instead of the initial application definition schema, without terminating or restarting the application,
wherein reconfiguring the application based on the updated application definition schema comprises reconfiguring the application from (a) performing the task using the first set of one or more operations of the first operation type to (b) performing the task using a second set of one or more operations of a second operation type;
receiving, by the application, a second request to perform the task;
determining, by the application based on the updated application definition schema corresponding to the application, the second set of one or more operations, of the second operation type, to perform the task, wherein the second set of operations is different than the first set of operations;
executing, by the application, the second set of operations to perform the task.

2. The method of claim 1, wherein the initial application definition schema defines a first set of candidate operations that the application can perform,
wherein the first set of operations is selected from the first set of candidate operations,
wherein the updated application definition schema defines a second set of candidate operations that the application can perform, the second set of candidate operations being different from the first set of candidate operations.

3. The method of claim 2, wherein the second set of operations includes at least one operation that is not included in the first set of candidate operations and is included in the second set of candidate operations.

4. The method of claim 2, wherein the second set of operations omits at least one operation that is included in the first set of candidate operations and is not included in the second set of candidate operations.

5. The method of claim 1, wherein the updated application definition schema includes a first application definition schema designed by a developer of the application and one or more customizations made to the application definition schema by a remote data provider.

6. The method of claim 1, wherein the task includes sending a query to a remote data provider and displaying, by the application, results of the query,
wherein the first set of operations includes displaying a first set of fields corresponding to an object stored by the remote data provider, and
wherein the second set of operations includes displaying a second set of fields corresponding to the object, wherein the second set of fields is different from the first set of fields.

7. The method of claim 1, wherein the task is sending a query to a remote data provider, the method further comprising:
selecting the query, from among a set of candidate queries, to send to the remote data provider based on the first request.

8. The method of claim 1, wherein the application is maintained continuously running from a time when the first request is received by the application, through a time when the updated application definition schema is received, and to a time when the second set of operations is executed.

9. A method, comprising:
specifying, based on an initial application definition schema corresponding to an application, operations for performing any task of the application;
receiving, by the application, a first request to perform a task;
determining, by the application based on the initial application definition schema, a first object type corresponding to the task;
executing, by the application, a set of one or more operations on a first object of the first object type to perform the task;
reconfiguring the application to determine the operations for performing any task based on an updated application definition schema, instead of the initial application definition schema, without terminating or restarting the application,
wherein reconfiguring the application based on the updated application definition schema comprises reconfiguring the application from (a) performing the task using the set of one or more operations on the first object of the first object type to (b) performing the task using the set of one or more operations on the second object of the second object type;
receiving, by the application, a second request to perform the task;
determining, by the application based on the updated application definition schema corresponding to the application, the second object of the second object type corresponding to the task; and
executing, by the application, the set of one or more operations on the second object of the second object type to perform the task.

10. The method of claim 9, wherein the application definition schema defines a first set of candidate object types that the application can process to perform the task,
wherein the first object type is selected from the first set of candidate object types,
wherein the updated application definition schema defines a second set of candidate object types that the application can process to perform the task, the second set of candidate object types being different from the first set of candidate object types.

11. The method of claim 10, wherein the second object type is not included in the first set of candidate object types and is included in the second set of candidate object types.

12. The method of claim 10, wherein the first object type is not included in the second set of candidate object types.

13. The method of claim 9, wherein the updated application definition schema includes an initial application definition schema designed by a developer of the application and one or more customizations made to the application definition schema by a remote data provider.

14. The method of claim 9, wherein the task includes sending a query to a remote data provider to access one or more fields of the first object or the second object, and displaying, by the application, results of the query.

15. The method of claim 9, wherein the application is maintained continuously running from a time when the first request is received by the application, through a time when the updated application definition schema is received, and to a time when the set of operations is executed on the second object.

16. One or more non-transitory machine-readable media storing instructions which, when executed by one or more processors, cause:
- specifying, based on an initial application definition schema corresponding to an application, operations for performing any task of the application;
- receiving, by the application, a first request to perform a task;
- determining, by the application based on the initial application definition schema, a first set of one or more operations, of a first operation type, to perform the task;
- executing, by the application, the first set of operations to perform the task;
- reconfiguring the application to determine the operations for performing any task based on an updated application definition schema, instead of the initial application definition schema, without terminating or restarting the application,
- wherein reconfiguring the application based on the updated application definition schema comprises reconfiguring the application from (a) performing the task using the first set of one or more operations of the first operation type to (b) performing the task using a second set of one or more operations of a second operation type;
- receiving, by the application, a second request to perform the task;
- determining, by the application based on the updated application definition schema corresponding to the application, the second set of one or more operations, of the second operation type, to perform the task, wherein the second set of operations is different than the first set of operations;
- executing, by the application, the second set of operations to perform the task.

17. The media of claim 16, wherein the initial application definition schema defines a first set of candidate operations that the application can perform,
- wherein the first set of operations is selected from the first set of candidate operations,
- wherein the updated application definition schema defines a second set of candidate operations that the application can perform, the second set of candidate operations being different from the first set of candidate operations.

18. The media of claim 17, wherein the second set of operations includes at least one operation that is not included in the first set of candidate operations and is included in the second set of candidate operations.

19. The media of claim 17, wherein the second set of operations omits at least one operation that is included in the first set of candidate operations and is not included in the second set of candidate operations.

20. One or more non-transitory machine-readable media storing instructions which, when executed by one or more processors, cause:
- specifying, based on an initial application definition schema corresponding to an application, operations for performing any task of the application;
- receiving, by the application, a first request to perform a task;
- determining, by the application based on the initial application definition schema, a first object type corresponding to the task;
- executing, by the application, a set of one or more operations on a first object of the first object type to perform the task;
- reconfiguring the application to determine the operations for performing any task based on an updated application definition schema, instead of the initial application definition schema, without terminating or restarting the application,
- wherein reconfiguring the application based on the updated application definition schema comprises reconfiguring the application from (a) performing the task using the set of one or more operations on the first object of the first object type to (b) performing the task using the set of one or more operations on the second object of the second object type;
- receiving, by the application, a second request to perform the task;
- determining, by the application based on the updated application definition schema corresponding to the application, the second object of the second object type corresponding to the task, wherein the second object type is different than the first object type;
- executing, by the application, the set of one or more operations on the second object of the second object type to perform the task.

21. The media of claim 20, wherein the initial application definition schema defines a first set of candidate object types that the application can process to perform the task,
- wherein the first object type is selected from the first set of candidate object types,
- wherein the updated application definition schema defines a second set of candidate object types that the application can process to perform the task, the second set of candidate object types being different from the first set of candidate object types.

22. The media of claim 21, wherein the second object type is not included in the first set of candidate object types and is included in the second set of candidate object types.

23. The media of claim 21, wherein the first object type is not included in the second set of candidate object types.

* * * * *